(12) United States Patent
Kishiyama

(10) Patent No.: US 9,713,161 B2
(45) Date of Patent: Jul. 18, 2017

(54) METHOD AND APPARATUS FOR REDUCING INTERFACE WITHIN RADIO NETWORKS USING NON-ORTHOGONAL SIGNAL PROCESSING

(75) Inventor: Yoshihisa Kishiyama, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 134 days.

(21) Appl. No.: 14/111,224

(22) PCT Filed: May 17, 2012

(86) PCT No.: PCT/JP2012/062646
§ 371 (c)(1),
(2), (4) Date: Oct. 11, 2013

(87) PCT Pub. No.: WO2012/161080
PCT Pub. Date: Nov. 29, 2012

(65) Prior Publication Data
US 2014/0029562 A1   Jan. 30, 2014

(30) Foreign Application Priority Data

May 20, 2011   (JP) .................................. 2011-114026
Oct. 14, 2011   (JP) .................................. 2011-227143

(51) Int. Cl.
H04W 72/08   (2009.01)
H04L 27/26   (2006.01)
(Continued)

(52) U.S. Cl.
CPC ....... *H04W 72/082* (2013.01); *H04J 11/0036* (2013.01); *H04L 27/2691* (2013.01); *H04B 1/711* (2013.01); *H04L 25/03821* (2013.01)

(58) Field of Classification Search
CPC ........ H04B 2201/709709; H04B 1/711; H04L 5/0073; H04L 27/2691; H04L 25/03821; H04W 72/082; H04W 52/242
See application file for complete search history.

(56) References Cited

U.S. PATENT DOCUMENTS

2003/0128674 A1* 7/2003 Kong ..................... H04B 7/264
370/320
2003/0174675 A1* 9/2003 Willenegger .......... H04B 7/022
370/335
(Continued)

FOREIGN PATENT DOCUMENTS

JP   2009 010752   1/2009
JP   2009 111995   5/2009
(Continued)

OTHER PUBLICATIONS

Schaepperle J et al.,"Enhancement of throughput and fairness in 4G wireless access systems by non-orthogonal signaling", Bell Labs Technical Journal, vol. 13, No. 4, Dec. 21, 2008, pp. 59-77.*
Extended European Search Report issued Jan. 27, 2015 in Patent Application No. 12789044.0.
Shun Tomida et al., "Non-orthogonal Access with SIC in Cellular Downlink for User Fairness Enhancement", 2011 International Symposium on Intelligent Signal Processing and Communication Systems (ISPACS), XP-032107718, Dec. 7, 2011, 6 pages.
(Continued)

*Primary Examiner* — Andrew Chriss
*Assistant Examiner* — Salvador E Rivas
(74) *Attorney, Agent, or Firm* — Oblon, McClelland, Maier & Neustadt, L.L.P.

(57) ABSTRACT

Provided are a receiver, a transmitter and a radio communication method capable of using non-orthogonal multiple access while suppressing cost increase and processing delay. A mobile station 200A includes a physical channel segmentation unit 210 and data demodulating/decoding units 220. A radio resource block allocated to non-orthogonal signals is defined in a frequency domain, a time domain and a non-orthogonal multiplex domain. The non-orthogonal multiplex domain has multiple levels corresponding to the number of interference cancellations by the data demodulating/decoding units 220. Interference canceller of the mobile station 200A cancels a non-orthogonal signal whose allocated radio resource block is at a lower level than that of the mobile station 200A.

12 Claims, 13 Drawing Sheets

(51) Int. Cl.
  *H04J 11/00* (2006.01)
  *H04B 1/711* (2011.01)
  *H04L 25/03* (2006.01)

(56) References Cited

U.S. PATENT DOCUMENTS

| | | | |
|---|---|---|---|
| 2009/0042581 A1* | 2/2009 | Liu | H04L 5/0007 455/450 |
| 2009/0279587 A1* | 11/2009 | Eriksson | H04B 1/7143 375/133 |
| 2010/0246711 A1 | 9/2010 | Kishigami et al. | |
| 2010/0290548 A1 | 11/2010 | Hoshino et al. | |
| 2013/0058288 A1* | 3/2013 | Nentwig | H04J 11/0023 370/329 |

FOREIGN PATENT DOCUMENTS

| | | |
|---|---|---|
| JP | 2011-227143 | 11/2011 |
| WO | 2009 081514 | 2/2009 |

OTHER PUBLICATIONS

Joerg Schaepperle et al., "Enhancement of Throughput and Fairness in 4G Wireless Access Systems by Non-Orthogonal Signaling", Bell Labs Technical Journal, vol. 13, No. 4, XP-001519580, Dec. 21, 2008, pp. 59-78.

Kishiyama Y., "Initial Views on Non-orthogonal Multiple Access Based Radio Interface for Future Radio Access", The Institute of Electronics, Information and Communication Engineers (IEICE), pp. 37-42 (Jul. 14, 2011) (with English abstract).

D. Tse, et al., "Fundamentals of Wireless Communication", Cambridge University Press, 584 pages, 2005.

International Search Report Issued Aug. 7, 2012 in PCT/JP12/062646 Filed May 17, 2012.

Japanese Office Action issued May 10, 2016 in Patent Application No. 2015-147589. With English translation (4 pages).

* cited by examiner

METHOD AND APPARATUS FOR REDUCING INTERFACE WITHIN RADIO NETWORKS USING NON-ORTHOGONAL SIGNAL PROCESSING

TECHNICAL FIELD

The present invention relates to a receiver, a transmitter and a radio communication method which are adapted to non-orthogonal multiple access.

BACKGROUND ART

Mobile communication systems, for example, Long Term Evolution (LTE) standardized by the 3GPP, widely use orthogonal multiple access in which multiple orthogonal signals not interfering with each other are used between a base station and user terminals (mobile stations). On the other hand, there has been proposed non-orthogonal multiple access using non-orthogonal signals to increase the capacity of a mobile communication system (for example, see Non-patent document 1).

The non-orthogonal multiple access is based on the premise of signal separation (interference canceller) through non-linear signal processing. For example, in the case of downlink, a base station concurrently transmits non-orthogonal signals to multiple user terminals. Each of the user terminals performs signal processing to remove, from the received non-orthogonal signals, a signal addressed to a user terminal (at a cell edge) having a larger path loss than the user terminal itself, and then demodulates the resultant signal.

PRIOR ART DOCUMENT

Non-Patent Document

Non-patent document 1: D. Tse and P. Viswanath, "Fundamentals of Wireless Communication", Cambridge University Press, 2005, <http://www.eecs.berkeley.edu/todtse/book.html> on the Internet.

SUMMARY OF THE INVENTION

As described above, in the case of non-orthogonal multiple access, each user terminal, i.e., each mobile station needs to perform demodulation after signal processing of removing the signal addressed to a mobile station having a larger path loss than the mobile station itself. For this reason, the processing load in the mobile station is so high that problems of cost increase and processing delay of the mobile station may occur. A possible solution to these problems is to introduce hybrid orthogonal/non-orthogonal multiple access in which orthogonal multiple access and non-orthogonal multiple access are used in combination. With this introduction, the problems of cost increase and processing delay of the mobile station can be expected to reduce to some degree.

In the implementation point of view, however, it is preferable that each mobile station be able to recognize the conditions of mobile stations multiplexed in non-orthogonal multiple access in order to achieve further cost and processing delay reductions.

Therefore, the present invention has been made in consideration of the above circumstances, and has an objective to provide a receiver, a transmitter, and a radio communication method capable of using non-orthogonal multiple access while suppressing cost increase and processing delay.

In summary, a first feature of the present invention is a receiver (for example, a mobile station 200A) including: a radio signal reception unit (a physical channel segmentation unit 210) configured to receive radio signals including multiple non-orthogonal signals which are not orthogonal to each other; an interference cancelation unit (data demodulating/decoding units 220) configured to extract the non-orthogonal signal addressed to the receiver from the multiple non-orthogonal signals received by the radio signal reception unit, by demodulating and cancelling the radio signal addressed to another receiver; and a demodulation unit (the data demodulating/decoding units 220) configured to demodulate the signal extracted by the interference cancelation unit and addressed to the receiver. A radio resource block allocated to the non-orthogonal signals is defined in a frequency domain, a time domain and a non-orthogonal multiplex domain. The non-orthogonal multiplex domain has multiple levels corresponding to the number of interference cancellations by the interference cancelation unit. The interference cancelation unit cancels the non-orthogonal signal whose allocated radio resource block is at a lower level than that of the receiver.

In summary, a second feature of the present invention is a transmitter (a base station 100) including: a radio signal transmission unit (a hybrid orthogonal/non-orthogonal multiplexer 130 and a physical channel multiplexer 160) configured to transmit radio signals to multiple receivers located within a cell, the radio signals including multiple non-orthogonal signals which are not orthogonal to each other; and an allocation unit (coding/data modulating units 110) configured to allocate a radio resource block to the non-orthogonal signals. The allocation unit allocates, to the non-orthogonal signals, the radio resource block defined in a frequency domain, a time domain, and a non-orthogonal multiplex domain having multiple levels corresponding to the number of interference cancellations in the receivers.

In summary, a third feature of the present invention is a radio communication method including the steps of: receiving radio signals by a communication device, the radio signals including multiple non-orthogonal signals which are not orthogonal to each other; extracting, by the communication device, the non-orthogonal signal addressed to the communication device from the received multiple non-orthogonal signals by demodulating and cancelling the radio signal addressed to another receiver; and demodulating, by the communication device, the signal extracted in the extracting step and addressed to the receiver. A radio resource block allocated to the non-orthogonal signals is defined in a frequency domain, a time domain and a non-orthogonal multiplex domain. The non-orthogonal multiplex domain has multiple levels corresponding to the number of interference cancellations in the communication device. In the interference cancelling step, the non-orthogonal signal whose allocated radio resource block is at a lower level than that of the communication device is cancelled.

MODES FOR CARRYING OUT THE INVENTION

Figure 1:
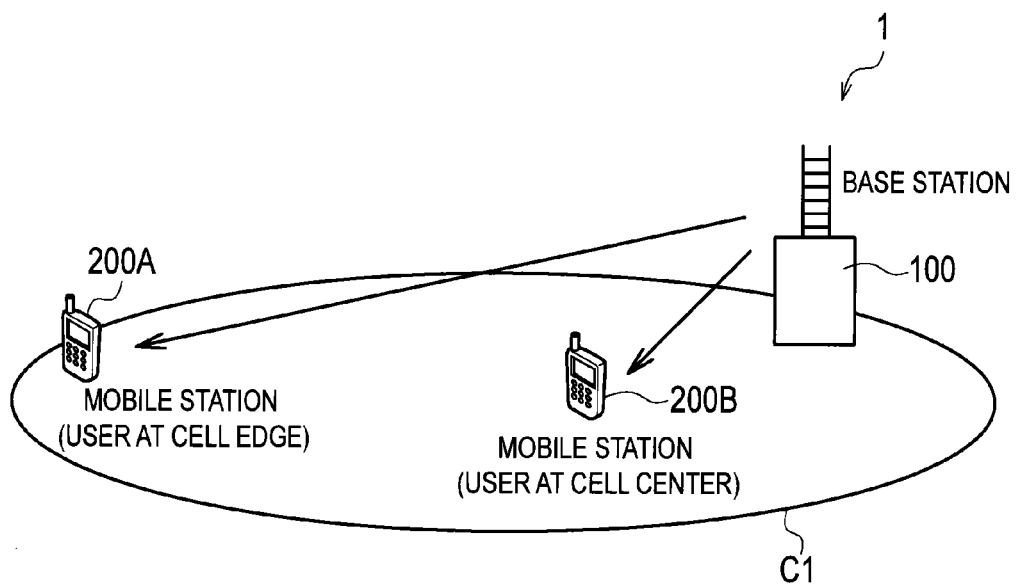
FIG. 1 is a diagram of an overall schematic configuration of a mobile communication system 1 according to an embodiment.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

FIG. 1 is a diagram of an overall schematic configuration of a mobile communication system 1 according to this embodiment. As illustrated in FIG. 1, the mobile communication system 1 includes a base station 100 and mobile stations 200A, 200B.

The base station 100 transmits radio signals to the mobile stations 200A, 200B, more specifically to the inside of a cell C1. In addition, the base station 100 receives radio signals from the mobile stations 200A, 200B. In this embodiment, the base station 100 configures a transmitter and the mobile stations 200A, 200B each configure a receiver.

The mobile station 200A is located within the cell C1 but is located at a cell edge of the cell C1 where a path loss of a radio signal from the base station 100 is large. The mobile station 200B is located in the center within the cell C1. For this reason, the path loss of a radio signal from the base station 100 in the mobile station 200B is smaller than the path loss in the mobile station 200A.

In this embodiment, the base station 100 transmits radio signals to the mobile stations 200A, 200B located in the cell C1, the radio signals including multiple orthogonal signals that are orthogonal to each other, and multiple non-orthogonal signals that are not orthogonal to each other. In other words, the mobile communication system 1 uses a combination of orthogonal multiple access for implementing concurrent communications with multiple mobile stations using orthogonal signals, and non-orthogonal multiple access for implementing concurrent communications with the multiple mobile stations using non-orthogonal signals (hereinafter referred to as hybrid orthogonal/non-orthogonal multiple access).

Figure 2:
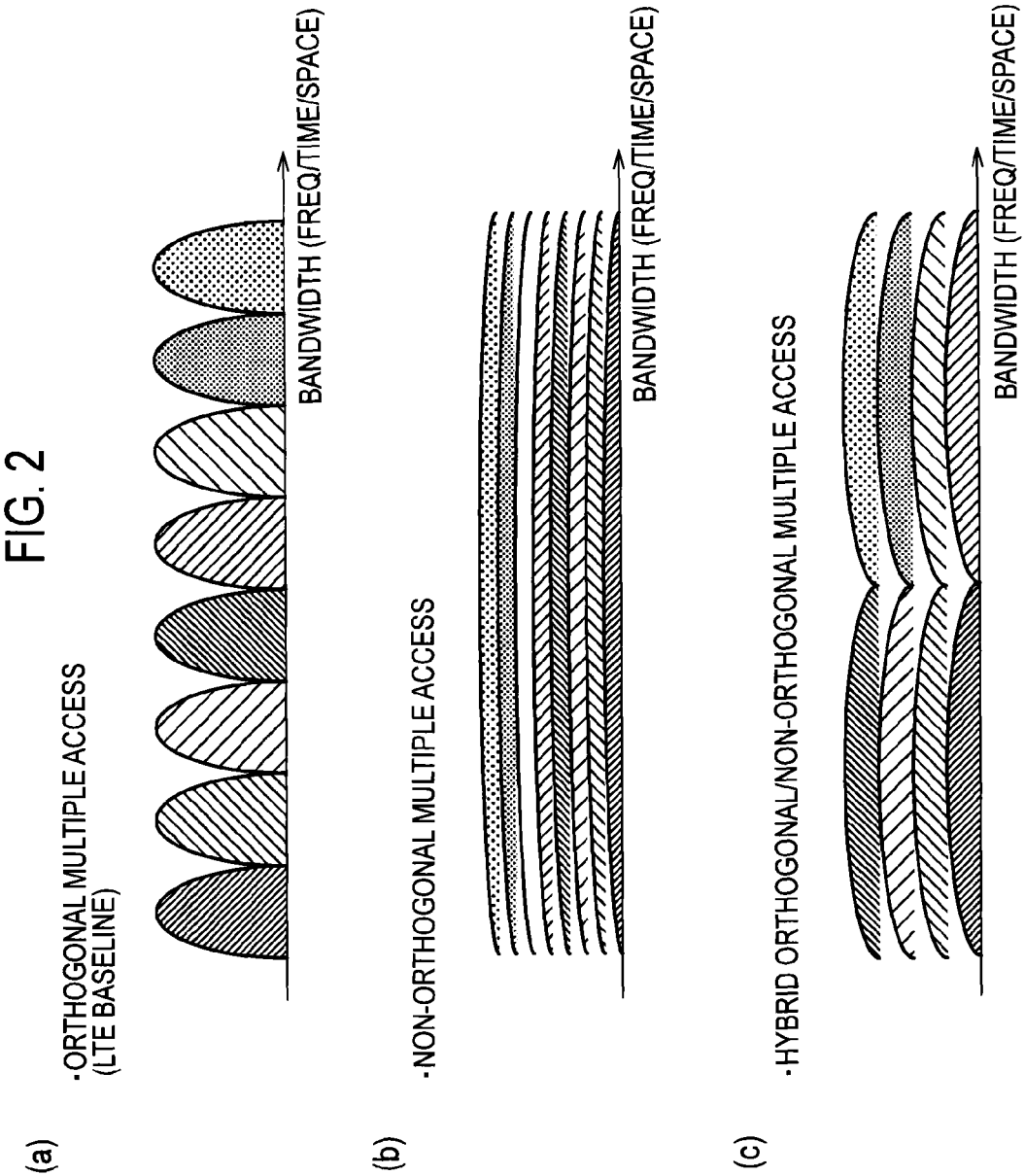
FIG. 2 is a diagram illustrating radio resource allocation images in orthogonal multiple access, non-orthogonal multiple access, and hybrid orthogonal/non-orthogonal multiple access.

Parts (a) to (c) of FIG. 2 illustrate radio resource allocation images in the orthogonal multiple access, the non-orthogonal multiple access, and the hybrid orthogonal/non-orthogonal multiple access. As illustrated in part (a) of FIG. 2, in the orthogonal multiple access, radio resources allocated to mobile stations (users) do not overlap each other in the bandwidth in a frequency domain/time domain/space domain. For this reason, in principle, the orthogonal multiple access does not need to remove interferences from the radio resources allocated to the other mobile stations. The orthogonal multiple access is also used in Long Term Evolution (LTE) standardized by the 3GPP.

As illustrated in part (b) of FIG. 2, in the non-orthogonal multiple access, radio resources allocated to mobile stations (users) overlap each other in the bandwidth mentioned above. For this reason, each mobile station needs to remove all the multiple access interferences through signal processing. The specific signal processing therefor can use the technique described in Non-patent document 1 mentioned above.

As illustrated in part (c) of FIG. 2, in the hybrid orthogonal/non-orthogonal multiple access, radio resources allocated to mobile stations (users) partly overlap each other in the bandwidth mentioned above. For this reason, each mobile station only has to remove multiple access interferences of a prescribed number or less according to the number of multiplexed radio resources.

This embodiment reduces a signal processing load associated with removal of multiple access interferences by introducing the aforementioned hybrid orthogonal/non-orthogonal multiple access, and specifies a radio interface enabling a mobile station to recognize the number of multiple access interferences to be removed.

(2) Functional Block Configuration

Figure 3:
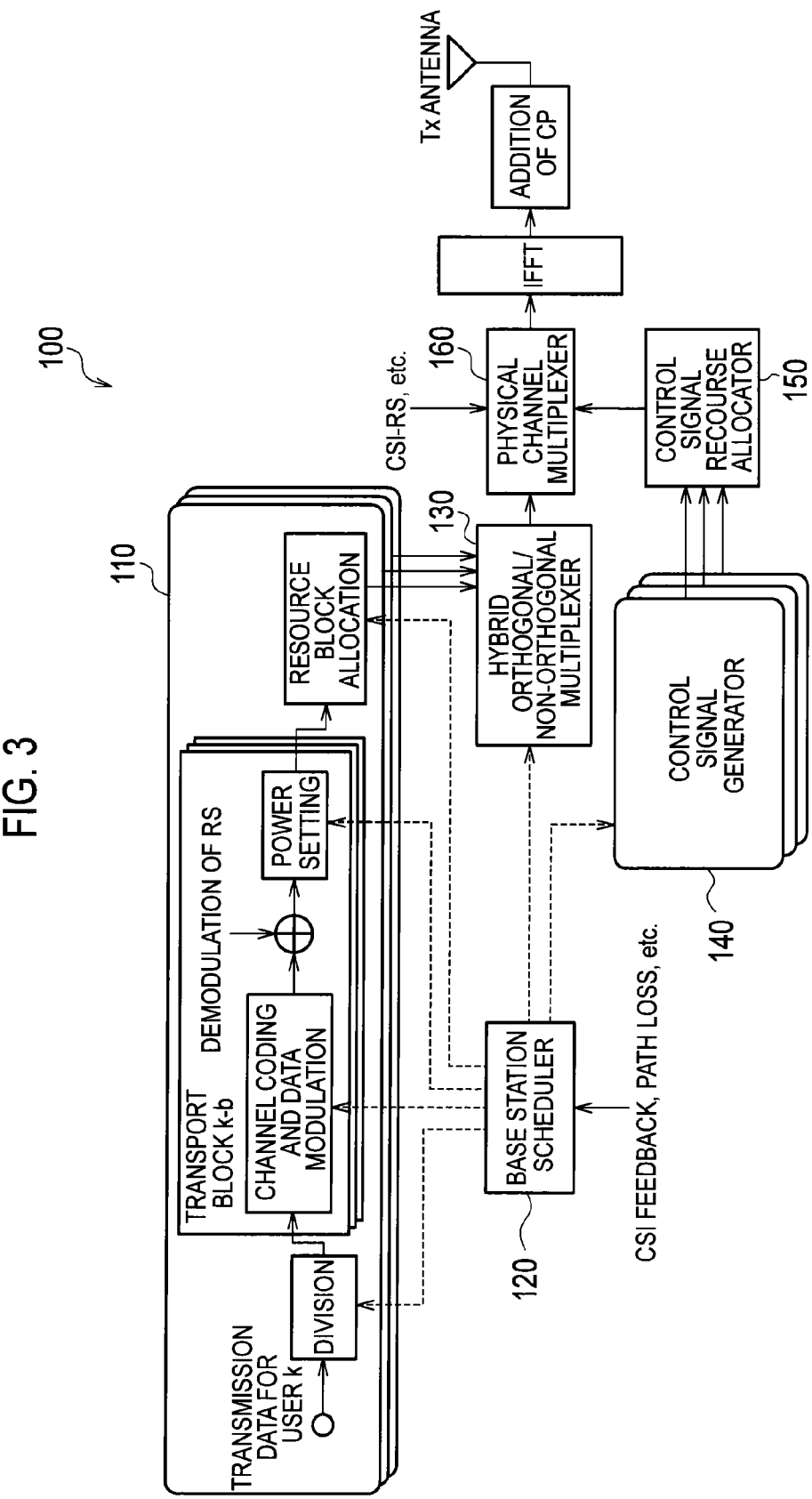
FIG. 3 is a diagram of a functional block configuration of a transmission unit of a base station 100 according to the embodiment of the present invention.
Figure 4:
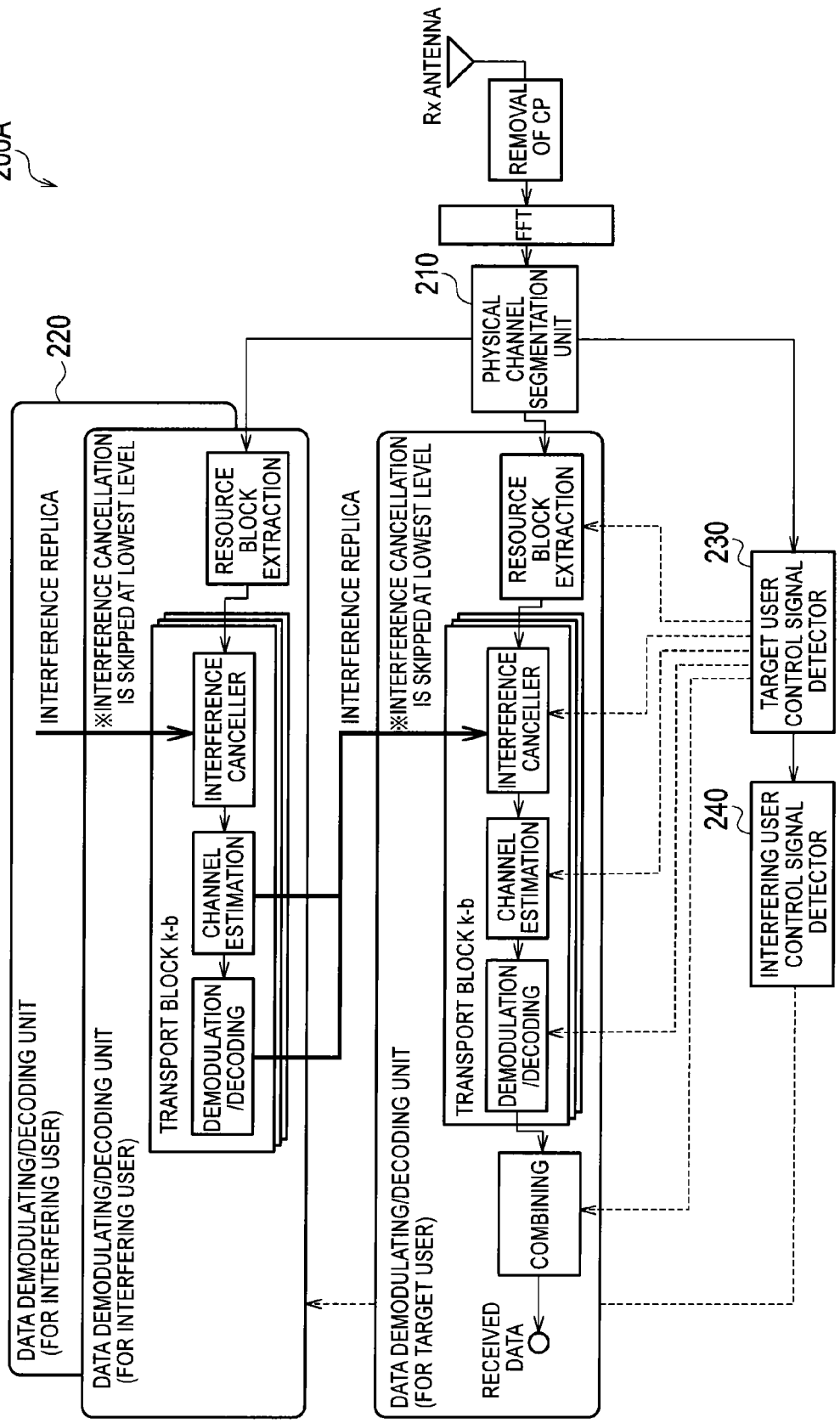
FIG. 4 is a diagram of a functional block configuration of a reception unit of a mobile station 200A according to the embodiment of the present invention.

Next, a functional block configuration of the mobile communication system 1 is described. FIG. 3 is a diagram of a functional block configuration of a transmission unit of the base station 100. FIG. 4 is a diagram of a functional block configuration of a reception unit of the mobile station 200A.

(2.1) Base Station 100

As illustrated in FIG. 3, a transmission unit of the base station 100 includes coding/data modulating units 110, a base station scheduler 120, a hybrid orthogonal/non-orthogonal multiplexer 130, a control signal generator 140, a control signal resource allocator 150 and a physical channel multiplexer 160.

The coding/data modulating units 110 perform division of transmission data, channel coding/data modulation, transmission power setting, and resource block allocation for their respective predetermined users (user k). In this embodiment, in particular, the coding/data modulating units 110 allocate radio resource blocks to orthogonal signals and non-orthogonal signals included in radio signals to be transmitted to the mobile stations 200A, 200B.

The base station scheduler 120 controls the coding/data modulating units 110, the hybrid orthogonal/non-orthogonal multiplexer 130 and the control signal generator 140 on the basis of information such as feedbacks of Circuit State Information (CSI) from the mobile stations 200A, 200B, and the path loss between the base station 100 and each of the mobile stations 200A, 200B.

In this embodiment in particular, the base station scheduler 120 schedules signals multiplexed as non-orthogonal signals for multiple mobile stations (for example, the mobile stations 200A, 200B), on the basis of the path losses of the signals multiplexed as non-orthogonal signals to the respective multiple mobile stations, in such a way that the signals can have a large difference in the path loss among them.

Figure 5:
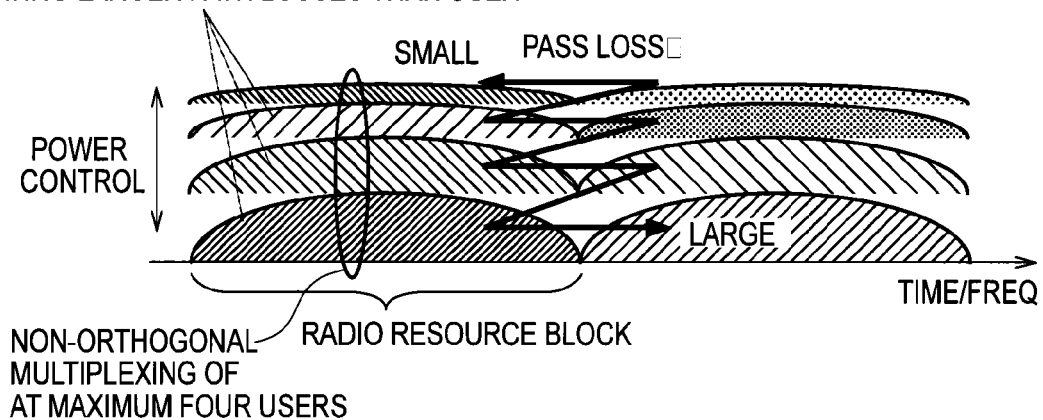
FIG. 5 is a diagram illustrating an example of scheduling of non-orthogonal signals for mobile stations in the base station 100 according to the embodiment of the present invention.

FIG. 5 illustrates an example of scheduling of non-orthogonal signals for mobile stations in the base station 100. The example illustrated in FIG. 5 uses non-orthogonal signals with which at maximum four users (mobile stations) are multiplexed. As illustrated in FIG. 5, in the case of non-orthogonal signals, multiple signals are not orthogonal to each other, in other words, the same radio resource block in the frequency domain or time domain is allocated to the multiple signals.

In this embodiment, signals are multiplexed as non-orthogonal signals sequentially from a signal addressed to a mobile station having the smallest path loss to a signal addressed to a mobile station having the largest path loss. A signal addressed to a mobile station having a small path loss only needs low transmission power to surely obtain a desired SNR, and therefore accounts for a small share in a vertical axis (transmission power) direction in FIG. 5. On the other hand, a signal addressed to a mobile station having a large path loss needs high transmission power to surely obtain a desired SNR, and therefore accounts for a large share in the vertical axis (transmission power) direction in FIG. 5.

In the case of using such non-orthogonal signals, the user (mobile station) having, for example, the second smallest path loss needs to remove interferences from the signals allocated to the two mobile stations having the larger path losses than the user (see explanation in the drawing).

Note that, the example illustrated in FIG. 5 also uses orthogonal signals to which different radio resource blocks in the frequency domain and time domain are allocated, i.e., multiple signals orthogonal to each other. Since the aforementioned interference does not occur between the orthogonal signals, the mobile stations do not have to remove the interference.

The hybrid orthogonal/non-orthogonal multiplexer 130 multiplexes the orthogonal signals and the non-orthogonal signals. Specifically, the hybrid orthogonal/non-orthogonal multiplexer 130 multiplexes signals (radio resource blocks) outputted from the multiple coding/data modulating units 110 under the control of the base station scheduler 120. As a result, the multiplexed signals as illustrated in FIG. 5 are generated.

The control signal generator 140 generates various kinds of control signals to be broadcasted to the mobile stations 200A, 200B. In this embodiment, in particular, the maximum number of signals multiplexed as non-orthogonal signals (for example, quad multiplexing) is known to the base station 100 and the mobile stations 200A, 200B. The control signal generator 140 generates a control signal necessary for a mobile station to demodulate and cancel radio signals addressed to other mobile stations (other devices).

The control signal generator 140, for example, can generate a signal including the following control information or reference signal in order for the mobile station to demodulate and cancel radio signals addressed to other mobile stations (other devices):

(a) information indicating the number (including 0 or 1) of multiple access interferences to be removed by a user (mobile station);

(b) information indicating the conditions (such as allocated radio resource block, modulation scheme and channel coding rate) of other users, which are needed by the user (mobile station) to remove multiple access interferences;

(c) a reference signal necessary for coherent demodulation in the user (mobile station); and (d) information (transport block, definition of a radio resource block, transmission power control, feedback control signal, and the like) necessary for allocation of radio resource blocks in the hybrid orthogonal/non-orthogonal multiple access.

The control signal generator 140 may generate a control signal including any one or any combination of the above (a) to (d). The control signal generator 140 transmits the generated control signal to the mobile stations 200A, 200B via the control signal resource allocator 150 and the physical channel multiplexer 160.

The control signal resource allocator 150 allocates a radio resource block to the control signal outputted from the control signal generator 140.

The physical channel multiplexer 160 multiplexes baseband signals outputted from the hybrid orthogonal/non-orthogonal multiplexer 130 and the control signal outputted from the control signal resource allocator 150 with each other in physical channels. The signals outputted from the physical channel multiplexer 160 are subjected to IFFT and Cyclic Prefix (CP) is added to the resultant signals. Then, the signals are transmitted to the mobile stations 200A, 200B from a transmission antenna. In this embodiment, the hybrid orthogonal/non-orthogonal multiplexer 130 and the physical channel multiplexer 160 configure a radio signal transmission unit to transmit orthogonal signals and non-orthogonal signals to multiple mobile stations (receivers) located within the cell C1.

(2.2) Mobile Station 200A

As illustrated in FIG. 4, the mobile station 200A includes a physical channel segmentation unit 210, data demodulating/decoding units 220, a target user control signal detector 230 and an interfering user control signal detector 240. Note that the mobile station 200B has the same functional block configuration as the mobile station 200A.

The physical channel segmentation unit 210 receives radio signals transmitted from the base station 100, and performs segmentation of physical channels included in the radio signals. As described above, the radio signals received by the physical channel segmentation unit 210 include the orthogonal signals and the non-orthogonal signals. The segmented physical channels are outputted to the data demodulating/decoding units 220, the target user control signal detector 230 and the interfering user control signal detector 240. In this embodiment, the physical channel segmentation unit 210 configures a radio signal reception unit.

There are provided multiple data demodulating/decoding units 220. Specifically, the data demodulating/decoding units 220 are provided for interfering users and a target user according to the number of signals (users) multiplexed as non-orthogonal signals. In this embodiment, since at maximum four users are multiplexed, it is preferable to also provide four data demodulating/decoding units 220.

The data demodulating/decoding units 220 each execute radio resource block extraction, interference canceller, channel estimation, demodulation/decoding and decoded data combining.

In particular, in this embodiment, the interference canceller of the data demodulating/decoding units 220 extracts the non-orthogonal signal addressed to the mobile station 200A from the multiple non-orthogonal signals by demodulating and cancelling the radio signals addressed to the other mobile stations (receivers) by use of the orthogonal signals (for example, the foregoing control information and reference signal) included in the received radio signals.

Specifically, the interference canceller extracts the signal addressed to the device itself from the received non-orthogonal signals by signal separation through predetermined signal processing, and cancels the interferences from the signals addressed to the other receivers. Since the maximum number of multiplexed non-orthogonal signals is known (quad multiplexing in this embodiment), the interference canceller demodulates and cancels the radio signals addressed to the other receivers within the range not exceeding the known maximum number of non-orthogonal signals. Note that the interference cancelling method will be described later.

In addition, the data demodulating/decoding unit 220 demodulates the signal included in the orthogonal signals and addressed to the mobile station 200A and the signal extracted by the interference canceller and addressed to the mobile station 200A.

The target user control signal detector 230 detects the control signal addressed to the target user, i.e., the device (mobile station 200A) itself. The target user control signal detector 230 provides the detected control signal to the data demodulating/decoding unit 220 (for the target user). Anyone or combination of the above (a) to (d) is used as the control signal.

The interfering user control signal detector 240 detects the control signals addressed to the interfering users, i.e., the other devices (for example, the mobile station 200B). As similar to the target user control signal detector 230, the interfering user control signal detector 240 provides the detected control signals to the data demodulating/decoding units 220 (for the interfering users).

Figure 12A:
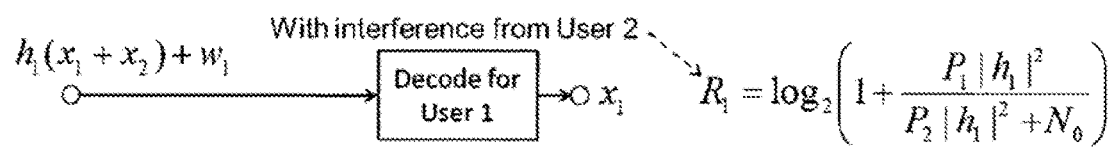
FIG. 12A is an exemplary illustration of a computational expression of signal processing for a first user.

Here, the signal processing in the interference canceller in the data demodulating/decoding units 220 is explained briefly. First, when the mobile station 200A is located at the cell edge of the cell C1 as illustrated in FIG. 1, the interference canceller cannot remove the signal of the mobile station 200B located in the center within the cell C1. For this reason, the data demodulating/decoding units 220 perform the demodulation/decoding directly. Specifically, the signal processing in the user 1 can be explained based on the computational expression illustrated in FIG. 12A.

Here, the user 1 denotes the mobile station 200A located at the cell edge of the cell C1, and the user 2 denotes the mobile station 200B located in the center in the cell C1. $P_1$ and $P_2$ are transmission powers of the user 1 and the user 2, and $h_1$ and $h_2$ are channel gains of the user 1 and the user 2. As described above, in the case where the mobile station (user 1) is located at the cell edge, the received signals ($R_1$) include an interference from the mobile station (user 2) located in the cell center, but the user 1 cannot remove the interference from the user 2 because having a poorer SNR than the user 2. Hence, the user 1 executes the demodulation/decoding directly without removing the signal of the user 2.

Figure 12B:
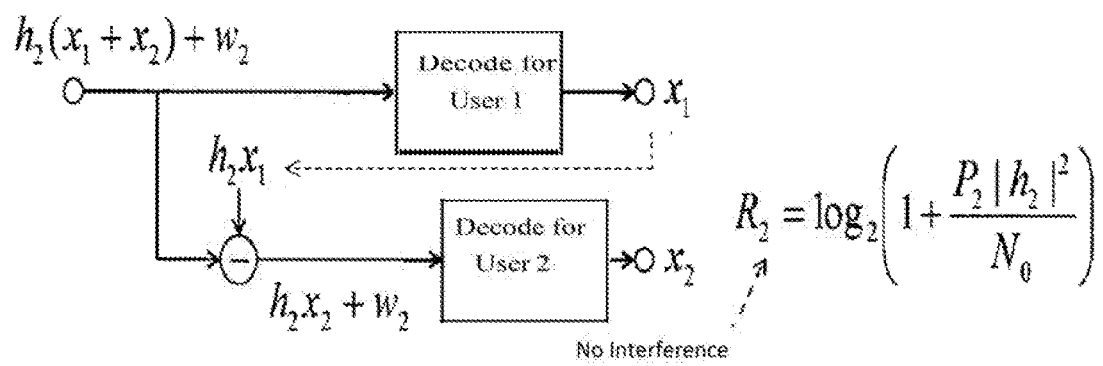
FIG. 12B is an exemplary illustration of a computational expression of signal processing for a second user.

On the other hand, the signal processing in the user 2 can be explained based on the computational expression illustrated in FIG. 12B.

As described herein and in FIG. 12B, in the case where the mobile station (user 2) is located at the cell center, the received signals ($R_2$) include an interference from the mobile station (user 1) located at the cell edge. Since the user 2 has a better SNR than the user 1, the user 2 removes the signal of the user 1 by decoding it once, and then demodulates/decodes the signal of the user 2 after removing the signal of the user 1.

Note that this signal processing is the same as the method described in above Non-patent document 1.

(3) Radio Resource Block Allocation Examples

Next, description is provided for radio resource block allocation examples. Specifically, radio resource block allocation examples 1 to 4 are described with reference to FIGS. 6 to 9.

(3.1) Allocation Example 1

Figure 6:
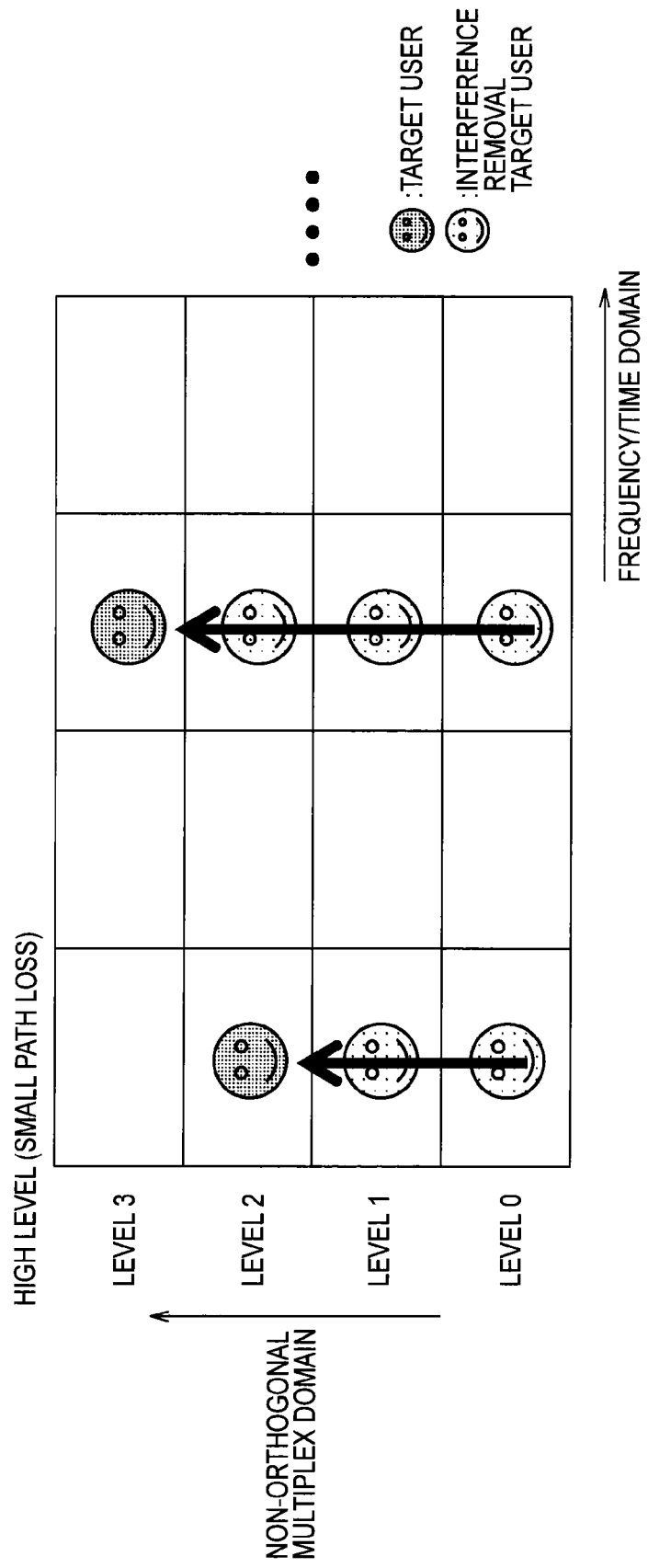
FIG. 6 is an explanatory diagram of a radio resource block allocation example 1 according to the embodiment of the present invention.

FIG. 6 is an explanatory diagram of a radio resource block allocation example 1. In this embodiment, in addition to the conventional frequency/time domain-based definitions of radio resource blocks, a radio resource domain (level) for non-orthogonal multiplexing is newly defined (hereinafter, referred to as a non-orthogonal multiplex domain). In other words, a radio resource blocks allocated to non-orthogonal signals is defined in the frequency domain, the time domain and the non-orthogonal multiplex domain.

The non-orthogonal multiplex domain has multiple levels according to the number of interference cancellations (or the order of interference cancellations) by the data demodulating/decoding units 220 (the interference canceller). Specifically, the number of interference cancellations is determined from the path losses between the base station 100 and the mobile stations 200A, 200B, and the radio resource block at a higher level is allocated for a smaller path loss. In other words, the coding/data modulating units 110 (allocation unit) of the base station 100 allocate, to non-orthogonal signals, a radio resource block defined in the frequency domain, the time domain and the non-orthogonal multiplex domain having the multiple levels according to the number of interference cancellations (the path losses to the mobile stations 200A, 200B or etc.).

The mobile station 200A, 200B (user itself) removes signals of mobile stations (interference removal target users) assigned to lower levels than the mobile station itself in the non-orthogonal multiplex domain within the radio resource block in the frequency/time domain to which the mobile station itself is assigned (each arrow in the drawing indicates the radio resource block allocated to non-orthogonal signals at the lower levels to be removed by a mobile station at the highest level). In short, the interference canceller of the mobile station 200A, 200B cancels the non-orthogonal signals whose allocated radio resource block is at lower levels than that of the mobile station itself.

Thus, with the definition of the non-orthogonal multiplex domain, a mobile station (user) and a radio resource block targeted for interference removal are automatically and uniquely determined based on the radio resource block allocated thereto.

(3.2) Allocation Example 2

Figure 7:
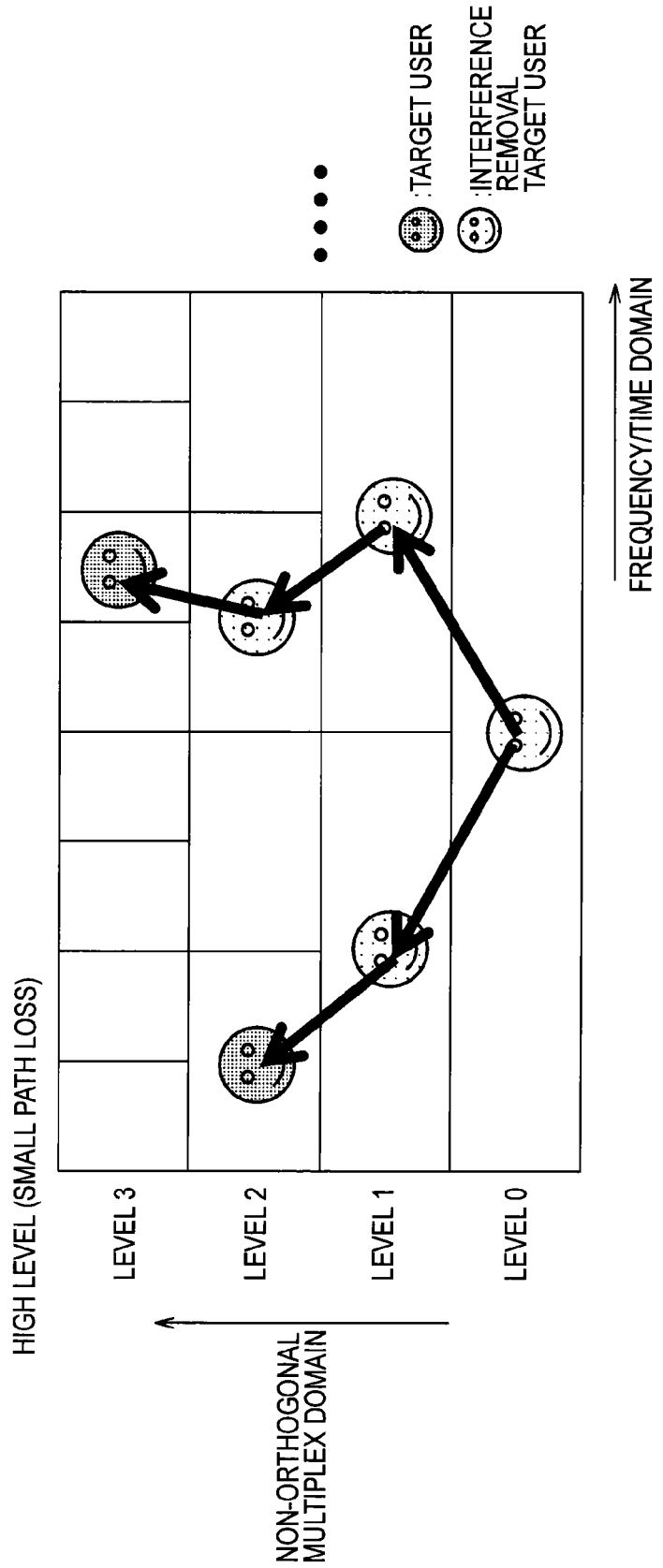
FIG. 7 is an explanatory diagram of a radio resource block allocation example 2 according to the embodiment of the present invention.

FIG. 7 is an explanatory diagram of a radio resource block allocation example 2. In the allocation example 2, hierarchical radio resource blocks are defined. Specifically, the size (in the frequency/time domain) of a radio resource block at a lower level is defined as being larger than the size (in the frequency/time domain) of a radio resource block at a higher level.

Specifically, the coding/data modulating units 110 (allocation unit) of the base station 100 allocate radio resource blocks to non-orthogonal signals in such a manner that a radio resource block at a lower level in the non-orthogonal multiplex domain has a larger size in the frequency domain or time domain than a radio resource block at a higher level in the non-orthogonal multiplex domain has.

In the allocation example 2, in the mobile station, part of the signal processing required to remove interferences can be also used for removal of other interferences, and thereby the processing volume is reduced (the number of interference removal target users is reduced by one as compared with the allocation example 1). In addition, a user having a larger path loss is multiplexed at a lower level, and accordingly a radio resource block in a relatively large size is allocated to a user having a large path loss, i.e., a user located at a cell edge. This resource allocation is expected to produce an effect of securing the coverage of the base station 100.

(3.3) Allocation Example 3

Figure 8:
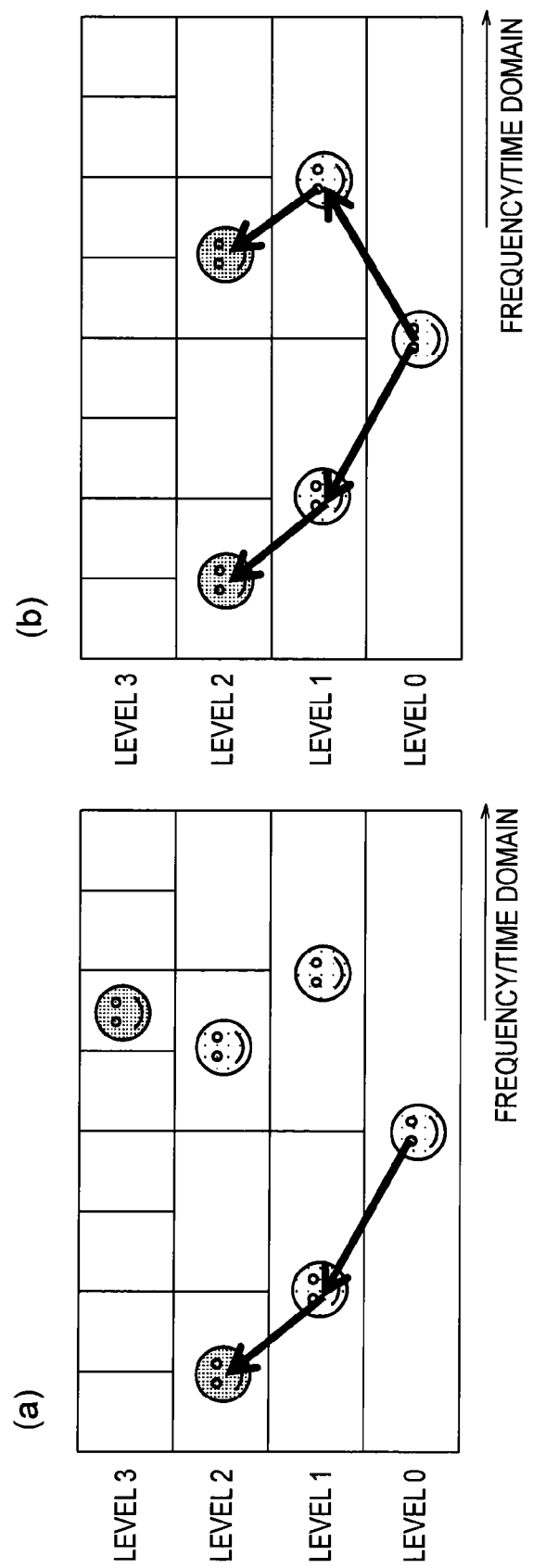
FIG. 8 is an explanatory diagram of a radio resource block allocation example 3 according to the embodiment of the present invention.

Parts (a) and (b) of FIG. 8 are explanatory diagrams of a radio resource block allocation example 3. In the radio resource block allocation example 3, a certain limitation is imposed on radio resource block allocation. Specifically, concurrent allocation of radio resource blocks in two or more frequency/time domains to a single user as illustrated in part (b) of FIG. 8 is allowed, but allocation of two or more levels to the single user as illustrated in part (a) of FIG. 8 is not allowed.

In other words, when allocating multiple radio resource blocks to a single transmission destination (mobile station 200A, 200B), the coding/data modulating units 110 (allocation unit) of the base station 100 allocate the radio resource blocks only at any of the levels in the non-orthogonal multiplex domain.

In the allocation example 3, radio resource blocks at a certain level in the non-orthogonal multiplex domain are allocated, which in turn suppresses variations in processing delay or the like associated with interference removal.

(3.4) Allocation Example 4

Figure 9:
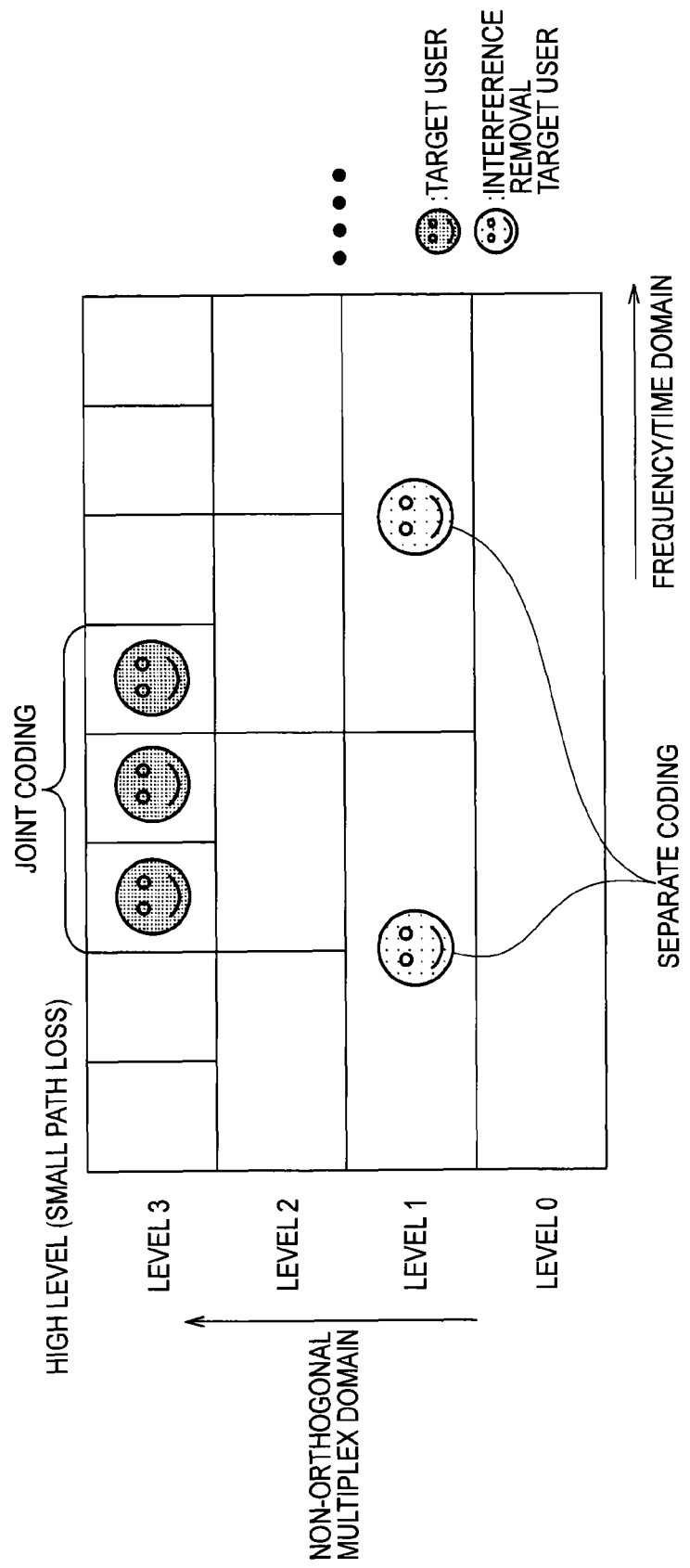
FIG. 9 is an explanatory diagram of a radio resource block allocation example 4 according to the embodiment of the present invention.

FIG. 9 is an explanatory diagram of a radio resource block allocation example 4. In the allocation example 4, transport block allocation methods (coding methods) are specified. Specifically, in a case of allocating multiple radio resource blocks in frequency/time domain to a particular mobile station (user), there are candidate coding methods: a method of coding in the radio resource blocks independently (Separate coding); a method of coding in the radio resource blocks collectively (Joint coding); or a hybrid method of the above two.

In principle, the Separate coding is needed for the removal of interferences from non-orthogonal signals addressed to other mobile stations as described above. In the allocation example 4, the Separate coding is applied to a low level in the non-orthogonal multiplex domain and the Joint coding is applied to a high level (the highest level in the example in FIG. 9).

Specifically, in the allocation example 4, information allocated to radio resource blocks at the low level in the non-orthogonal multiplex domain is coded in the unit of each radio resource block, whereas information allocated to radio resource blocks at the high level in the non-orthogonal multiplex domain is coded in the unit of two or more radio resource blocks. Incidentally, although the Joint coding is applied to the three consecutive radio resource blocks in the frequency/time domain in the example illustrated in FIG. 9, radio resource blocks to which the Joint coding is applied do not necessarily have to be consecutive.

In the allocation example 4, the Joint coding is applied limitedly to the high level since signals multiplexed at the high level have a low possibility of being targeted for removal of interferences from non-orthogonal signals. This limited application can lead to an improvement in coding gain or efficient utilization of radio resources.

(3.5) Allocation Example 5

Figure 10:
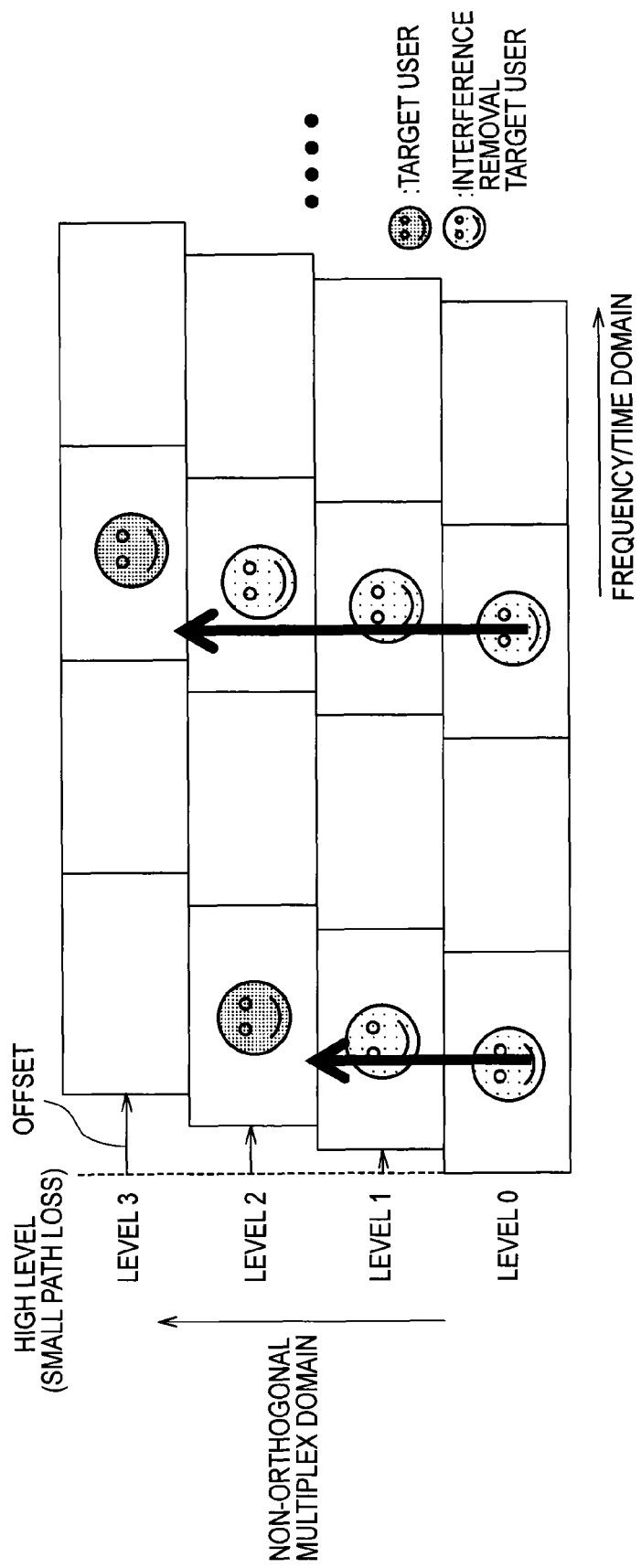
FIG. 10 is an explanatory diagram of a radio resource block allocation example 5 according to the embodiment of the present invention.

FIG. 10 is an explanatory diagram of a radio resource block allocation example 5. The allocation example 5 is similar to the allocation example 1 illustrated in FIG. 6, but is different in that boundaries in a radio resource block (frequency/time domain) are offset among the levels in the non-orthogonal multiplex domain. Specifically, the coding/data modulating units 110 (allocation unit) of the base station 100 allocate radio resource block to non-orthogonal signals such that the boundaries in the frequency domain or time domain of the radio resource block at a low level in the non-orthogonal multiplex domain is offset from the boundaries in the frequency domain or time domain of the radio resource block at a high level in the non-orthogonal multiplex domain. Incidentally, although the boundaries at all the levels are offset in the same direction (right direction in the drawing) in the example illustrated in FIG. 10, the boundaries may be offset in different directions among the levels.

In the allocation example 5, the boundaries of the radio resource blocks are offset and do not coincide with each other among the levels, and therefore reduction in interference among the levels and reduction in peak transmission power can be achieved.

(4) Examples of Operations and Effects

According to the mobile communication system 1 in this embodiment, with the definition of the non-orthogonal multiplex domain as described above, a mobile station (user) and a radio resource block targeted for interference removal are automatically and uniquely determined based on the radio resource block allocated thereto. Thus, the processing load for removing multiple access interferences due to use of non-orthogonal signals can be reduced, and therefore the cost increase and processing delay of mobile stations and the like can be suppressed in a situation where hybrid orthogonal/non-orthogonal multiple access is introduced.

(5) Other Embodiments

Although the content of the present invention is disclosed through the embodiment of the present invention as described above, it should not be understood that the description and drawings constituting part of this disclosure limit the present invention. From this disclosure, various alternative embodiments would be obvious to those skilled in the art.

Figure 11:
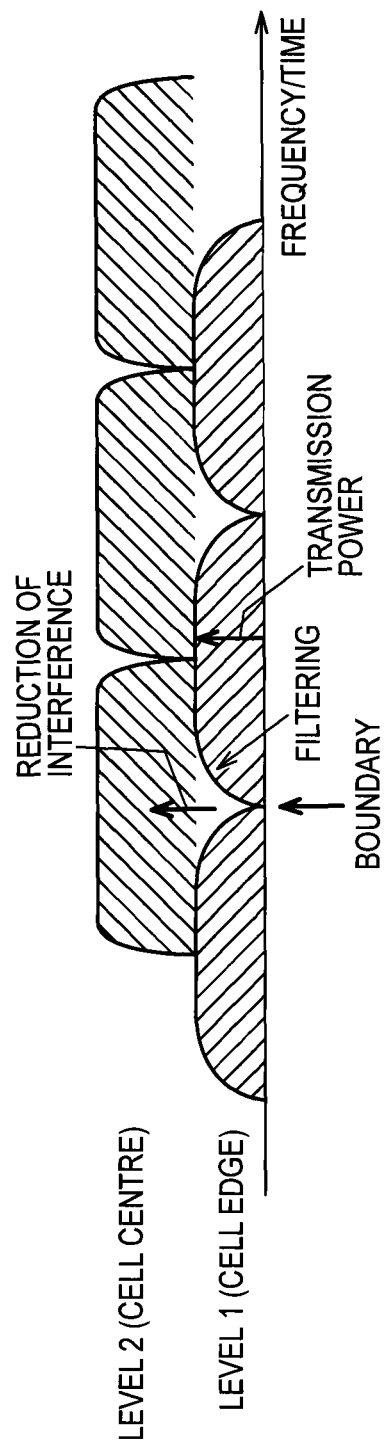
FIG. 11 is an explanatory diagram of a radio resource block allocation example according to a modified example of the present invention.

For example, FIG. 11 illustrates a radio resource block allocation example according to a modified example of the present invention. As illustrated in FIG. 11, the coding/data modulating units 110 (allocation unit) of the base station 100 apply filtering to the vicinities of the boundaries of a radio resource block (in the frequency/time domain). By the filtering, the transmission power density of a radio resource block is lowered toward the boundary.

In the example illustrated in FIG. 11, performed is filtering (Windowing) in which the transmission power of a radio resource block allocated to a user at the level 1 in the non-orthogonal multiplex domain (located at the cell edge) is lowered smoothly toward the boundaries of the radio resource block. Such filtering can reduce out-of-band transmission and peak power. Moreover, in the case where the boundaries are offset among the levels in the non-orthogonal multiplex domain as in the aforementioned operational example 5, an interference with a user at the level 2 (located at the cell center) can be reduced as illustrated in FIG. 11.

Additionally, the coding/data modulating units 110 may vary the intensity of the filtering according to the levels in the non-orthogonal multiplex domain. For instance, a roll-off rate of the filtering may be increased as the level becomes lower. Note that such filtering can be applied to not only downlink and but also uplink.

Moreover, in the foregoing embodiments of the present invention, the examples of downlink from the base station 100 to the mobile stations 200A, 200B are described. However, the hybrid orthogonal/non-orthogonal multiple access according to the present invention can be applied to uplink. Moreover, the present invention can be also applied to radio communications not only between the base station and mobile stations, but also between base stations.

Furthermore, the foregoing embodiments are described by taking as the example the case where the hybrid orthogonal/non-orthogonal multiple access is introduced. The application range of the present invention, however, is not limited to the hybrid orthogonal/non-orthogonal multiple access, but obviously includes any mobile communication system using non-orthogonal multiple access.

As described above, the present invention naturally includes various embodiments which are not described herein. Accordingly, the technical scope of the present invention should be determined only by the matters defining the invention in the scope of claims regarded as appropriate based on the foregoing description.

The entire contents of Japanese Patent Application No. 2011-114026 (filed on May 20, 2011) and Japanese Patent Application No. 2011-227143 (filed on Oct. 14, 2011) are incorporated herein by reference.

INDUSTRIAL APPLICABILITY

According to the features of the present invention, provided are a receiver, a transmitter, and a radio communication method capable of using non-orthogonal multiple access while suppressing cost increase and processing delay.

EXPLANATION OF THE REFERENCE NUMERALS 1 mobile communication system
100 base station
110 coding/data modulating unit
120 base station scheduler
130 hybrid orthogonal/non-orthogonal multiplexer
140 control signal generator
150 control signal resource allocator
160 physical channel multiplexer
200A, 200B mobile station
210 physical channel segmentation unit
220 data demodulating/decoding unit
230 target user control signal detector
240 interfering user control signal detector

The invention claimed is:

1. A receiver comprising:
circuitry configured to
receive radio signals including a plurality of non-orthogonal signals which are not orthogonal to each other;
extract a non-orthogonal signal addressed to the receiver from the plurality of non-orthogonal signals received by the circuitry, by demodulating and cancelling a radio signal addressed to another receiver; and
demodulate the extracted non-orthogonal signal addressed to the receiver, wherein
a radio resource block allocated to the non-orthogonal signals is defined in a frequency domain, a time domain and a non-orthogonal multiplex domain,
the non-orthogonal multiplex domain has a plurality of levels corresponding to a number of interference cancellations by the circuitry,
the circuitry cancels the non-orthogonal signal whose allocated radio resource block is at a lower level than that of the receiver,
wherein the number of interference cancellations is determined from a number of path losses associated with the received radio signals, and
wherein a radio resource block at a higher level associated with interference cancellations is allocated for a smaller path loss than a radio resource block at a lower level associated with interference cancellations that is lower than the higher level.

2. A transmitter comprising:
circuitry configured to
transmit radio signals to a plurality of receivers located within a cell, the radio signals including a plurality of non-orthogonal signals which are not orthogonal to each other; and
allocate a radio resource block to the non-orthogonal signals, wherein
the radio resource block is defined in a frequency domain, a time domain, and a non-orthogonal multiplex domain having a plurality of levels corresponding to a number of interference cancellations in the receivers
wherein the number of interference cancellations is determined from a number of path losses associated with the transmitted radio signals, and
wherein a radio resource block at a higher level associated with interference cancellations is allocated for a smaller path loss than a radio resource block at a lower level associated with interference cancellations that is lower than the higher level.

3. The transmitter according to claim 2, wherein the circuitry allocates the radio resource block to the non-orthogonal signals such that the radio resource block at the lower level in the non-orthogonal multiplex domain has a larger size in the frequency domain or the time domain than the radio resource block at the higher level in the non-orthogonal multiplex domain.

4. The transmitter according to claim 2, wherein when allocating a plurality of radio resource blocks to a single transmission destination, the circuitry allocates radio resource blocks only at any of the levels in the non-orthogonal multiplex domain.

5. The transmitter according to claim 2, wherein
the circuitry performs coding such that information allocated to radio resource blocks at the lower level in the non-orthogonal multiplex domain is coded in a unit of each radio resource block and that information allocated to radio resource blocks at the higher level in the non-orthogonal multiplex domain is coded in a unit of a plurality of radio resource blocks.

6. The transmitter according to claim 2, wherein
the circuitry allocates the radio resource block to the non-orthogonal signals such that a boundary in the frequency domain or the time domain of the radio resource block at the lower level in the non-orthogonal multiplex domain is offset from a boundary in the frequency domain or the time domain of the radio resource block at the higher level in the non-orthogonal multiplex domain.

7. The transmitter according to claim 6, wherein
the circuitry applies filtering to a vicinity of the boundary in the frequency domain or the time domain of the radio resource block, the filtering causes the circuitry to lower a transmission power density toward the boundary.

8. The transmitter according to claim 7, wherein the circuitry varies an intensity of the filtering according to a level in the non-orthogonal multiplex domain.

9. A method comprising:
receiving radio signals by a communication device, the radio signals including a plurality of non-orthogonal signals which are not orthogonal to each other; and
extracting, by the communication device, a non-orthogonal signal addressed to the communication device from the plurality of received non-orthogonal signals by demodulating and cancelling a radio signal addressed to another receiver; and
demodulating, by the communication device, the signal extracted in the extracting step and addressed to the communication device, wherein
a radio resource block allocated to the non-orthogonal signals is defined in a frequency domain, a time domain and a non-orthogonal multiplex domain,
the non-orthogonal multiplex domain has a plurality of levels corresponding to a number of interference cancellations in the communication device, and
in the interference cancelling step, the non-orthogonal signal whose allocated radio resource block is at a lower level than that of the communication device is cancelled,
wherein the number of interference cancellations is determined from a number of path losses associated with the received radio signals, and
wherein a radio resource block at a higher level associated with interference cancellations is allocated for a smaller path loss than a radio resource block at a lower level associated with interference cancellations that is lower than the higher level.

10. The transmitter according to claim 1, wherein radio resource blocks allocated to the non-orthogonal signals at the highest level of the non-orthogonal multiplex domain have a different size in the frequency domain or time domain than radio resource blocks at lower levels of the non-orthogonal multiplex domain.

11. The transmitter according to claim 1, wherein when allocating multiple radio resource blocks in the frequency domain or time domain to a particular receiver, a coding in the radio resource blocks collectively is implemented for a highest level of the non-orthogonal multiplex domain and a coding in the radio resource blocks independently is implemented for levels of the non-orthogonal multiplex domain that are lower than the highest level.

12. The transmitter according to claim 1, wherein boundaries of a radio resource block in the frequency domain or time domain are offset among the plurality of levels in the non-orthogonal multiplex domain.

* * * * *